(12) United States Patent
Cheng

(10) Patent No.: US 7,313,147 B2
(45) Date of Patent: Dec. 25, 2007

(54) NETWORK DEVICE AND ITS DATA TRANSMISSION METHOD

(75) Inventor: Sheng-Yuan Cheng, Chu-Pai (TW)

(73) Assignee: Infineon-ADMtek Co., Ltd., Hsinchu (TW)

( * ) Notice: Subject to any disclaimer, the term of this patent is extended or adjusted under 35 U.S.C. 154(b) by 205 days.

(21) Appl. No.: 11/052,818

(22) Filed: Feb. 9, 2005

(65) Prior Publication Data

US 2005/0180445 A1 Aug. 18, 2005

(30) Foreign Application Priority Data

Feb. 17, 2004 (TW) ............................ 93103682 A

(51) Int. Cl.
*H04L 12/28* (2006.01)
(52) U.S. Cl. ..................... 370/414; 370/416; 370/418; 370/429
(58) Field of Classification Search ................ 370/230, 370/241, 252, 310, 328, 338, 315, 345–347, 370/445–8, 412, 413, 414, 416, 477, 418, 370/428, 429, 463, 415
See application file for complete search history.

(56) References Cited

U.S. PATENT DOCUMENTS

| | | | |
|---|---|---|---|
| 5,896,418 A * | 4/1999 | Hamano et al. ............. 375/259 |
| 6,965,614 B1 * | 11/2005 | Osterhout et al. .......... 370/466 |
| 2003/0043771 A1 * | 3/2003 | Mizutani et al. ............ 370/338 |
| 2005/0175018 A1 * | 8/2005 | Wong .......................... 370/396 |

* cited by examiner

*Primary Examiner*—Edward F. Urban
*Assistant Examiner*—Nhan T Le
(74) *Attorney, Agent, or Firm*—Troxell Law Office, PLLC

(57) ABSTRACT

A network device for transmitting data of a host system to a network including a buffer for storing the data, a first transmission interface providing a control signal to the host system, and a second transmission interface coupled to the buffer for transmitting the data from the buffer to the network. A data transmission method of the network device includes the following steps: providing a network device and a host system, wherein the network device is providing a control signal to the host system, and the network device immediately activates a frame transmission procedure after providing the control signal; the host system starting to transmit data to the network device after the host system receives the control signal; and the network device transmitting the data to the network after a frame transmission pre-procedure is finished and when the data of the host system are completely transmitted to the network device.

13 Claims, 3 Drawing Sheets

NETWORK DEVICE AND ITS DATA TRANSMISSION METHOD

FIELD OF THE INVENTION

The present invention relates to a network device and its data transmission method, and more particularly to a network device and a method for transmitting data through wireless network with quality of service (QOS).

BACKGROUND OF THE INVENTION

Nowadays, wire network is greatly advanced and widely applied. However, it is not visual to dispose a lot of wires indoors. Furthermore, it is inconvenient to dispose the wires. Moreover, the wires occupy indoor space. To encounter the above problems, wireless network is developed. A conventional wireless local area network (WLAN) adopts IEEE802.11 wireless communication protocol and transmits data through frame. When a wireless network device connected with a computer transmits data through radio wave, the data are transmitted to a buffer of the wireless network device before the data are transmitted, and then the data are transmitted to the network through the buffer after the data are completely transmitted to the buffer.

In addition, a conventional wireless network device with QOS requires real time and different-categoried data. The different categories of data have different priority. So the network device transmits the data according to the priority of the data. The network device has a limited storing capacity and cannot store all categories of data at the same time. Therefore, when the required data are not stored at the network device, the data should be rapidly transmitted from a host system. However, transmission operation of the conventional network device cannot be activated until the data are completely transmitted to the buffer of the network device. So the conventional network device cannot meet the requirement of real time QOS transmission.

SUMMARY OF THE INVENTION

Accordingly, an object of the present invention is to provide a network device and its data transmission method for increasing data transmission throughput.

To achieve the above object, a network device of the present invention for transmitting data of a host system to a network includes a buffer for storing the data, a first transmission interface for providing a control signal to the host system, and a second transmission interface coupled to the buffer for transmitting the data from the buffer to the network. When the host system receives the control signal, the host system starts to transmit the data and the first transmission interface stores the data in the buffer. When the first transmission interface provides the control signal, the second transmission interface activates a frame transmission procedure. When the data are completely transmitted to the buffer after a frame transmission pre-procedure is finished, the data are read from the buffer and transmitted to the network.

A data transmission method of a network device of the present invention includes the following steps: a. providing a network device and a host system, wherein the network device is provideable a control signal to the host system, and the network device immediately activates a frame transmission procedure after providing the control signal; b. the host system starting to transmit data to the network device after the host system receives the control signal; and c. the network device transmitting the data to the network after a frame transmission pre-procedure is finished and when the data of the host system are completely transmitted to the network device.

Other objects, advantages and novel features of the present invention will be drawn from the following detailed embodiment of the present invention with attached drawings, in which:

DESCRIPTION OF THE PREFERRED EMBODIMENT

A network device of the present invention is characterized that when the network device actively requests a host system to transmit data, the network device promptly activates a frame transmission procedure and so it does not need to consider whether the host system starts to transmit the data to the network device.

Figure 1:
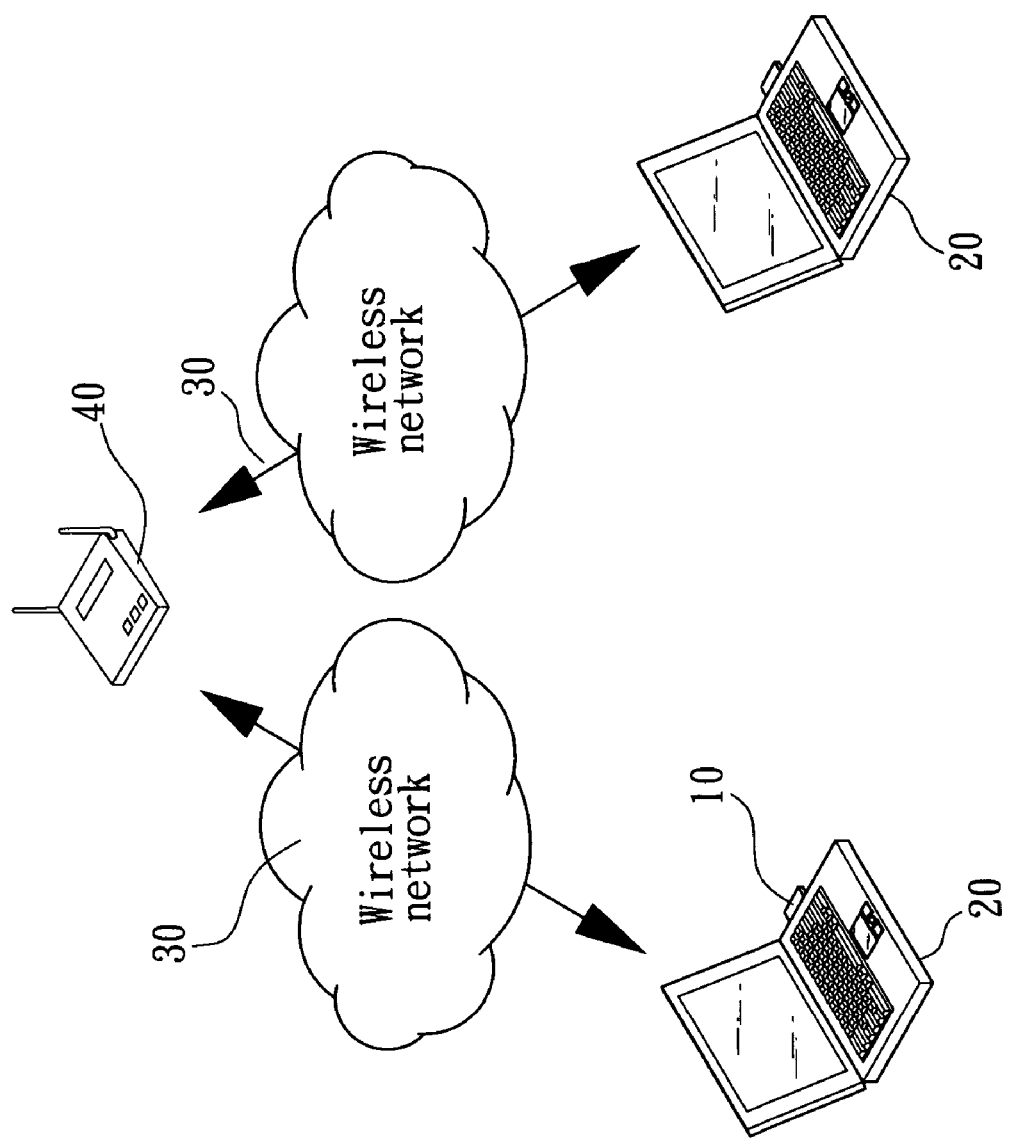
FIG. 1 is a schematic view showing a wireless network device of the present invention cooperating with a computer.
Figure 2:
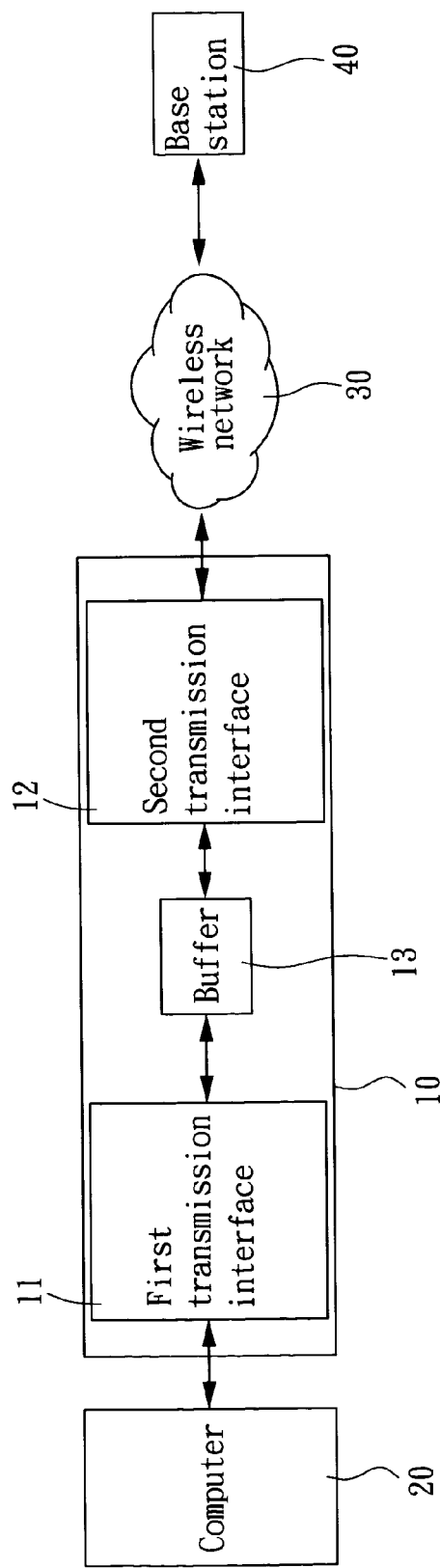
FIG. 2 is a block diagram of a wireless network device in accordance with a preferred embodiment of the present invention.

Referring to FIGS. 1-2, a schematic view of a wireless network device of the present invention cooperating with a computer and a block diagram of a wireless network device in accordance with a preferred embodiment of the present invention are shown. The network device 10 is a wireless network card and is connectable to a computer 20 for transmitting data to a wireless network 30 through radio wave. The data are then received and transmitted by a wireless local area network base station 40. The network device 10 includes a buffer 13, a first transmission interface 11 and a second transmission interface 12. The buffer 13 is for data storage. The first transmission interface 11 is connected with the computer 20. The network device 10 can request the computer 20 to transmit data to the network device 10 and receive the data from the computer 20 and then store the data in the buffer 13 through the first transmission interface 11. In the preferred embodiment, the first transmission interface 11 is a USB2.0 interface, a PCI interface or a CardBus interface. The second transmission interface 12 is coupled to the buffer 13 for capturing the data from the buffer 13 to transmit to the wireless network 40 through radio wave in accordance with wireless communication protocol. The second transmission interface 12 activates a frame transmission procedure to package the data to be transmitted in a manner of frame before transmitting the data in the buffer 13. The frame transmission procedure includes a carrier-sense, a network channel contention, and steps of transmitting a preamble, a header and a frame body. A frame transmission pre-procedure includes the carrier-sense, the network channel contention, and the steps of transmitting the preamble and the header. In accordance with IEEE802.11 wireless communication protocol, the frame transmitted by the network device 10 includes a preamble, a header and a frame body. The preamble is employed as a synchronous signal for facilitating the wireless local area network base station 40 to achieve signal synchronization. The header is for recording data transmission speed, length and other information. The frame body is for data transmission. Therefore, when data are transmitted to the wireless network 30 through the second transmission interface 12, the second transmission interface 12 packages the data in a manner of frame and then transmits the frame.

In operation of the network device 10 of the present invention, the first transmission interface 11 provides a control signal for requesting the computer 20 to transmit data. After receiving the control signal, the computer 20 starts to transmit the data to the network device 10. The data are stored in the buffer 13 through the first transmission interface 11. At the same time, the second transmission interface 12 activates the frame transmission procedure. After gaining network channel authority, the second transmission interface 12 transmits the preamble and the header to the wireless network 30. After finishing the header transmission, the second transmission interface 12 checks whether the data of the host system are completely transmitted to the buffer 13. When the data of the host system are completely transmitted to the buffer 13, the second transmission interface 12 starts to read the data of the buffer 13 and then transmits the data to the wireless network 30. Since it takes at least 96 μs for the wireless network device 10 to transmit the preamble and the header in accordance with the IEEE802.11b wireless communication protocol, the computer 20 has time enough to transmit the data to the buffer 13 during transmitting the preamble thereby increasing data transmission throughput of the wireless network device 10. However, when the data of the computer 20 are not completely transmitted to the buffer 13 when transmission of the preamble and the header is finished, the wireless network device 10 abandons the network channel authority. The network device continues to contend network channel authority for data transmission until the computer 20 completely transmits the data to the buffer.

Figure 3:
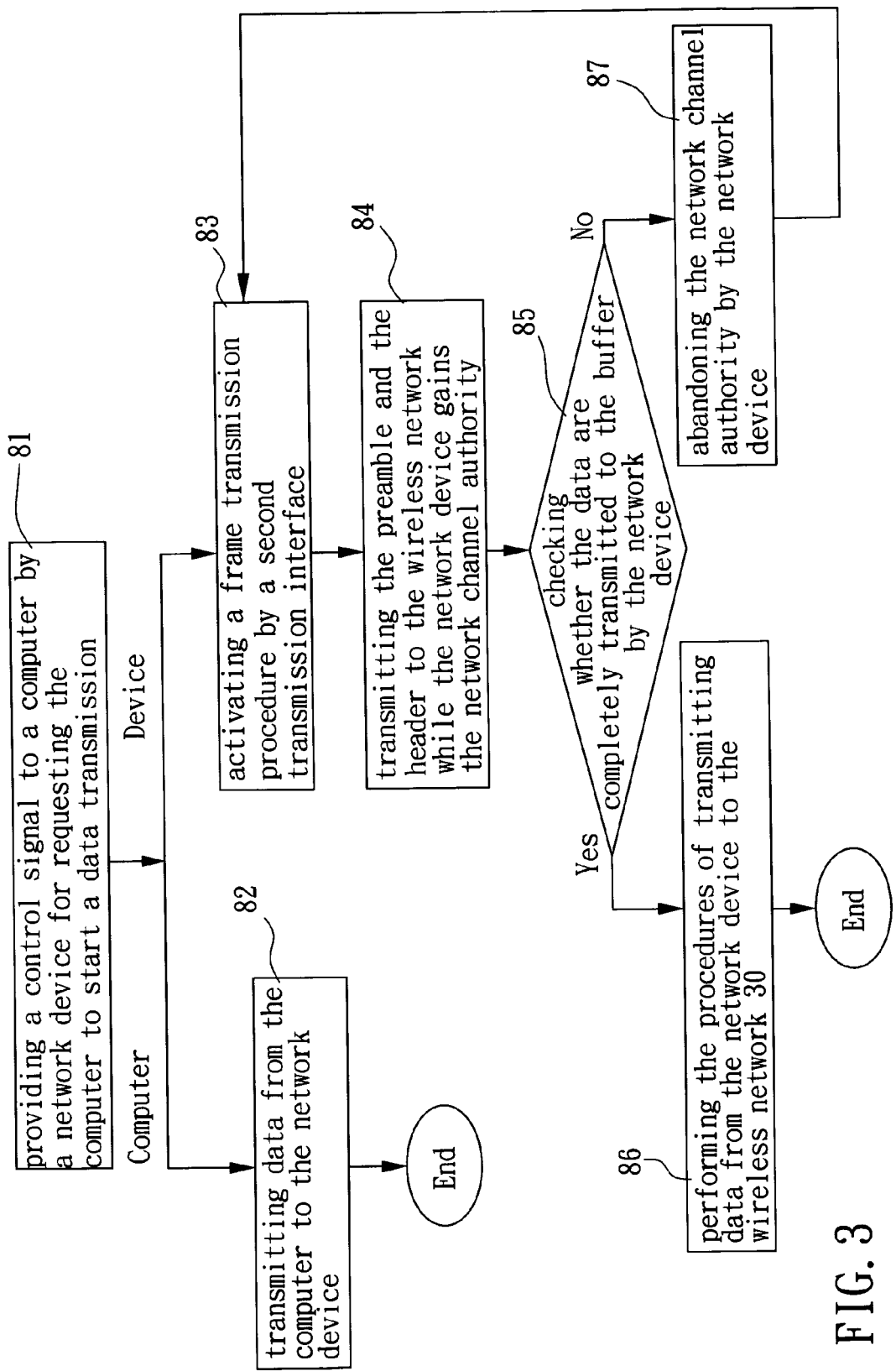
FIG. 3 is a flow chart of a data transmission method of the present invention.

Referring to FIG. 3, a flow chart of a data transmission method of the present invention is shown. The above wireless network device 10 is applied to transmit data in a manner of frame in accordance with wireless communication protocol. The frame includes a preamble, a header and a frame body. The method includes the following steps.

Step 81: the network device 10 provides a control signal to a computer 20 for requesting the computer 20 to start to transmit data.

Step 82: the computer 20 transmits the data to the network device 10 through the first transmission interface 11 and starts to store the data in a buffer 13.

Step 83: a second transmission interface activates a frame transmission procedure, and the wireless network device 10 starts to execute a carrier-sense and a network channel contention for gaining network channel authority. The network device 10 starts to transmit the data only after gaining the network channel authority.

Step 84: after the network device 10 gains the network channel authority, the preamble and the header are immediately transmitted to the wireless network 30. The network device 10 does not need to inspect or wait the computer 20 to transmit the data to the buffer 13, and transmits the preamble and the header to the wireless network 30.

Step 85: the network device 10 checks whether the data are completely transmitted to the buffer 13. If "yes", step 86 is executed. If "no", step 87 is executed.

Step 86: the network device 10 transmits the data of the buffer 13 to the wireless network 30 through the second transmission interface 12.

Step 87: the network device 10 abandons the network channel authority.

Through the above steps, when the network device 10 provides the control signal, the network device 10 starts to gain the network channel authority and transmit the preamble and the header to the wireless network 30 through the second transmission interface 12 and does not need to consider whether the computer 20 transmits the data to the buffer 13. After the header transmission is finished, the data of the computer 20 should be completely transmitted to the buffer 13. However, when the second transmission interface 12 finds that the data are not completely transmitted, the wireless network device 10 abandons the network channel authority. The network device continues to gain the network channel authority until the data are completely transmitted for ensuring the normal operation of the wireless network device 10.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A network device for transmitting data of a host system to a network, comprising:
   a buffer for data storage;
   a first transmission interface for providing a control signal to the host system, when the host system receives the control signal, the host system starting to transmit the data and the first transmission interface storing the data in the buffer; and
   a second transmission interface coupled to the buffer for transmitting the data from the buffer to the network;
   wherein when the first transmission interface provides the control signal, the second transmission interface activates a frame transmission procedure; and when the data are completely transmitted to the buffer after a frame transmission pre-procedure is finished, the data are read from the buffer and transmitted to the network,
   wherein the frame transmission procedure comprises a carrier-sense, a network channel contention, and steps of transmitting a preamble, a header and a frame body.

2. The network device as claimed in claim 1, wherein the frame transmission pre-procedure comprises a carrier-sense, a network channel contention, and steps of transmitting a preamble and a header.

3. The network device as claimed in claim 1, wherein the first transmission interface is a USB2.0 interface, a PCI interface or a CardBus interface.

4. The network device as claimed in claim 1, wherein the data transmission speed of the first transmission interface is higher than that of the second transmission interface.

5. A data transmission method of a network device comprising the following steps:
   a. providing a network device and a host system, wherein the network device is provideable a control signal to the host system, and the network device immediately activates a frame transmission procedure after providing the control signal;
   b. the host system starting to transmit data to the network device after the host system receives the control signal; and
   c. the network device transmitting the data to the network after a frame transmission pre-procedure is finished and when the data of the host system are completely transmitted to the network devices,
   wherein the frame transmission procedure comprises a carrier-sense, a network channel contention, and steps of transmitting a preamble, a header and a frame body.

6. The data transmission method as claimed in claim 5, wherein the frame transmission pre-procedure comprises the carrier-sense, the network channel contention, and steps of transmitting the preamble and the header.

7. The data transmission method as claimed in claim 5, wherein the network device comprises a buffer for storing the data, a first transmission interface for providing the control signal to the host system, and a second transmission interface coupled to the buffer for transmitting the data from the buffer to the network.

8. The data transmission method as claimed in claim 7, wherein the first transmission interface is a USB2.0 interface, a PCI interface or a CardBus interface.

9. The data transmission method as claimed in claim 7, wherein the data transmission speed of the first transmission interface is higher than that of the second transmission interface.

10. A data transmission method of a network device comprising the following steps:
  a. providing a network device having a first transmission interface and a second transmission interface, the first transmission interface being for receiving data of a host system, the second transmission interface being for transmitting the data to the network;
  b. the network device providing a control signal, wherein after the host system receives the control signal, the host system starts to transmit the data to the first transmission interface, and the second transmission interface activates a frame transmission procedure;
  c. checking whether the data of the host system are completely transmitted to the network device after a frame transmission pre-procedure is finished; and
  d. transmitting the data to the network when the data of the host system are completely transmitted to the network device; or the network device abandoning a network channel authority when the data of the host system are not completely transmitted to the network device, wherein the frame transmission procedure comprises a carrier-sense, a network channel contention, and steps of transmitting a preamble, a header and a frame body.

11. The data transmission method as claimed in claim 10, wherein the network device comprises a buffer coupled between the first and second transmission interfaces.

12. The data transmission method as claimed in claim 10, wherein the first transmission interface is a USB2.0 interface, a PCI interface or a CardBus interface.

13. The data transmission method as claimed in claim 10, wherein the frame transmission pre-procedure comprises the carrier-sense, the network channel contention, and steps of transmitting the preamble and the header.

* * * * *